March 21, 1961  J. J. ZRIMEC  2,976,067
EXTERNAL SEAL
Filed May 26, 1958

INVENTOR
John J. Zrimec
BY McCoy, Greene & TeGrotenhuis
ATTORNEYS

United States Patent Office 2,976,067
Patented Mar. 21, 1961

2,976,067
EXTERNAL SEAL

John J. Zrimec, Cleveland, Ohio, assignor to The Meriam Instrument Company, Cleveland, Ohio, a corporation of Ohio Filed May 26, 1958, Ser. No. 737,580
2 Claims. (Cl. 286—39)

This invention relates to external seals for cylindrical members and particularly to an external seal for glass tubes.

The sealing device of the present invention is in the form of a sealing ring that is expanded radially inwardly into sealing engagement with the exterior of a tube or other cylindrical member by axially applied pressure. The ring comprises an outer endless confining band and an inner packing ring that is held against radial outward expansion by the retaining band and which is expanded radially inwardly by axially applied pressure. The packing ring is formed of a relatively stiff but resilient material, preferably molded plastic that has a relatively low coefficient of friction and that is resilient but quite highly resistant to deformation under pressure. The packing ring is of a size to fit within the retaining band and is normally of greater axial height than the retaining band. In order to enable the relatively stiff packing ring to be expanded radially inwardly to an extent sufficient to provide an effective seal under an axial pressure which is much less than would otherwise be required to effect the necessary deformation, a circumferential groove is formed centrally in the exterior face of the packing ring and this groove, which is of a depth of more than one-half the radial thickness of the ring, provides the packing ring with a flexible central zone which bows inwardly when portions of the ring which are separated by the groove are squeezed together within the retaining band, thereby creating a narrow zone of concentrated pressure around the tube or other cylindrical member to which the seal is applied.

By reason of the fact that the packing ring has a light push fit in the retainer ring, only a relatively small axial thrust is required to force together the portions of the ring engaging the retaining band and separated by said groove, so that the major portion of the axial pressure exerted on the ring by an axially movable thrust member is applied to the edge thereof adjacent its interior face where it is most effective to expand the ring radially inwardly at its flexible zone. The outer band provides a backing against which the portions of the packing ring on opposite sides of its groove have wedging action.

Objects of the invention are to provide a simple and inexpensive sealing device particularly suitable for use as an external seal for glass tubes such as are used in pressure indicating instruments and to provide a seal in which the packing element is protected against damage by the application of excessive pressure.

Reference should be had to the accompanying drawings forming a part of this specification, in which.

Figure 1:
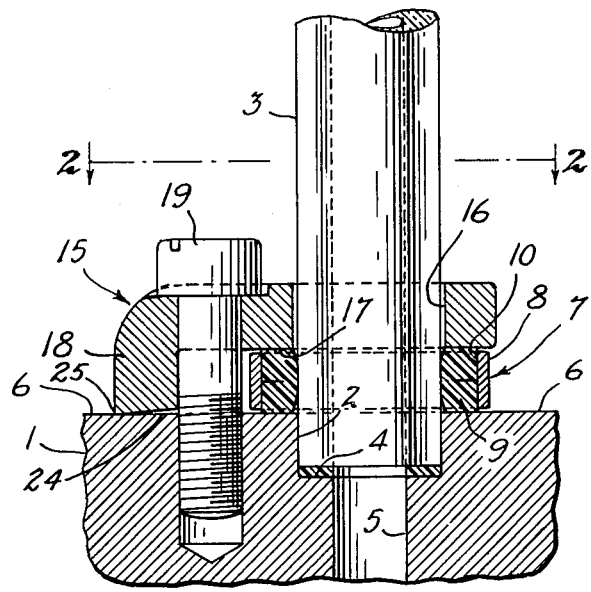
Figure 1 is a vertical section of a seal embodying the invention.
Figure 2:
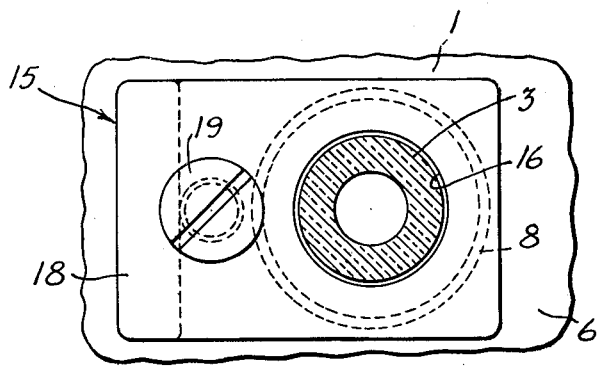
Fig. 2 is a horizontal section taken on the line indicated at 2—2 in Fig. 1.
Figure 3:
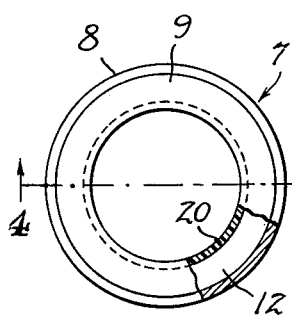
Fig. 3 is a plan view of the sealing ring with a portion broken away and shown in section.

In the accompanying drawings the invention is shown applied to a glass tube mounting which has a supporting block 1 provided with an aperture 22 to receive the lower end of a glass tube 3, a supporting shoulder 4 and a passage 5 that registers with the interior of the tube 3. The block 1 has a flat top face 6 which provides a seat around the aperture 2 for a sealing ring indicated generally by the numeral 77 that comprises an outer endless retaining band 8 which may be formed of metal and a packing ring 9 which is received within the retaining band 8. The packing ring 9 is preferably composed of a plastic composition that is resilient but relatively stiff.

The retaining band 8 has a cylindrical interior face 10 with which the cylindrical exterior face 11 of the packing ring 9 is slidably engaged. The ring 9 has a central external circumferentially continuous groove 12 which is of a depth more than one-half the radial depth of the ring, the groove 12 being preferably provided with outwardly flaring side walls 13 and 14.

A thrust member 15 is provided for applying axial pressure to the packing ring 9, the member 15 having an aperture 16 which receives the tube 3 with a small clearance. The member 15 has a flat bottom face 17 around the opening 16 for engagement with the packing ring 9. The thrust member 15 is in the form of a yoke having an end portion 18 that seats on the block 1 laterally of the ring 7. The portion 18 receives an adjusting and attaching screw 19 that is threaded into the supporting block 1 for securing the thrust member 15 to the block 1 and for applying an axial thrust to the packing ring 9.

Figures 4, 5:
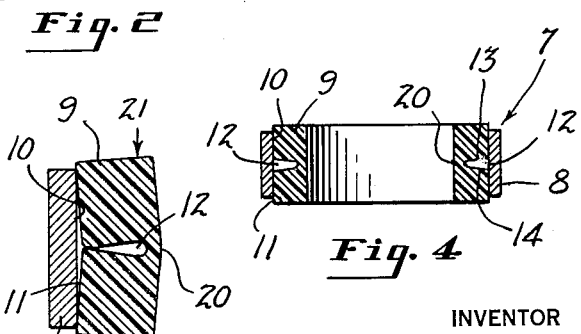
Fig. 4 is a section taken on the line indicated at 4—4 in Fig. 3.
Fig. 5 is a diagrammatic sectional view showing a deformation of the packing ring which can be effected by the exertion of a minimum force on the ring.

The groove 12 provides a flexible zone 20 adjacent to the interior face of the ring 9 and intermediate the edges thereof and provides a space between the outer portions of the ring 9 that engage with the retaining band 8. Fig. 5 of the drawings shows the packing ring 9 in a shape to which it can be deformed by the application of a small force. The portions of the exterior surface 11 on opposite sides of the groove will readily slide on the internal surface 10 of the retaining band 8 to the position shown in Fig. 5, the bending at the flexible zone 20 causing the interior face of the ring 9 to be bowed inwardly and portions of the face 11 to be moved out of contact with the surface 10 as shown in Fig. 5.

It will be apparent that when the ring 9 is clamped between the faces 6 and 17 the maximum pressure will be exerted thereon adjacent the interior of the ring 9 at the zones indicated at 21 and 22 in Fig. 5. As the member 15 is drawn downwardly against the ring 9 the portions of the ring separated by the groove 12 will be squeezed together, expanding the central portion of the ring 9 radially inwardly against the glass tube and radially outwardly against the interior surface of the retaining band 8.

The axial height of the packing ring 9 and the dimensions of the groove 12 are preferably such that the packing ring can be forced into the interior of the retaining band 8 as shown in Fig. 1 without exerting sufficient pressure on the packing ring to stress it beyond its deformation limit or impart a premanent set to the ring.

The flexing of the ring 9 at its central zone and the concentration of clamping pressure in the zones indicated at 21 and 22 in Fig. 5 causes the ring 9 to be pressed radially inwardly against the exterior surface of the tube 3, concentrating this pressure at a narrow circumferential zone centrally of the ring 9.

The end portion 18 of the thrust member 15 projects downwardly past the retaining band 8 for engagement with the face 6 to limit the downward movement of the member 15 and is provided with a beveled bottom face 24 that is inclined upwardly from its outer end to provide a fulcrum 25 about which the member 15 may rock slightly after it has been pressed down against the face 6 by the screw 19 to increase the pressure on the packing ring 9.

The packing ring 9 may be formed of various moldable plastic compositions such as vinyl or polyvinyl chlorides, vinyl chloride acetates or polyethylene. A plastic which has been found to be satisfactory is polytetrafluorethylene, which is sold under the trade name "Teflon."

The resilient sealing ring 9 having its interior face bowed inwardly and engaging the glass tube along a narrow circumferential zone provides an effective seal and also a resilient support for the tube which effectively damps vibrations.

It is to be understood that in accordance with the provisions of the patent statutes, variations and modifications of the specific devices herein shown and described may be made without departing from the spirit of the invention.

What I claim is:

1. An external seal for a cylindrical member comprising a block having an aperture to receive said member and a substantially flat seating face surrounding said aperture, a sealing ring engaging said face and surrounding said member, said ring comprising an outer endless retaining band having a cylindrical internal face and an inner packing ring within said band, said packing ring having a cylindrical external face and flat side edges and being normally of an axial width greater than that of said band and having its external face in sliding contact with the internal face of said band, said packing ring having a single centrally disposed circumferentially continuous groove in its external face that is of a depth greater than one half the radial thickness of the ring to provide said ring with a flexible zone intermediate its side edges, a thrust member encircling said cylindrical member and having a substantially flat face opposed to said seating face and engageable with said sealing ring, and means for moving said thrust member axially toward said seating face to press said packing ring against said seating face, to move into contact the portions of said ring separated by said groove and to bow the interior face of said ring radially inwardly into engagement with said cylindrical member at said flexible zone.

2. An external seal such as claimed in claim 1 in which the thrust member has an end portion that projects downwardly for engagement with the seating face of the block radially outwardly of said retaining band to limit the downward movement of said member and that has a beveled bottom face that is inclined upwardly from its outer end to provide a fulcrum about which said thrust member may rock after it engages with the face of the block.

References Cited in the file of this patent

UNITED STATES PATENTS

| | | |
|---|---|---|
| 1,021,180 | Clifton | Mar. 26, 1912 |
| 1,942,703 | Hubbard | Jan. 9, 1934 |
| 2,401,539 | Benson | June 4, 1946 |

FOREIGN PATENTS

| | | |
|---|---|---|
| 1,034,203 | France | Apr. 8, 1953 |
| 780,286 | Great Britain | July 31, 1957 |